US00RE43158E

(19) United States
(12) Reissued Patent
Dill et al.

(10) Patent Number: US RE43,158 E
(45) Date of Reissued Patent: Feb. 7, 2012

(54) DEVICE FOR HOLDING A PAPER SHEET

(75) Inventors: Etienne Dill, Jamaica, NY (US); Joel Spaes, Suresnes (FR)

(73) Assignee: Midland Innovations, Limited Liability Corporation, Won Chulk Hana (HK)

(21) Appl. No.: 11/106,737

(22) Filed: Apr. 13, 2005

Related U.S. Patent Documents

Reissue of:

(64) Patent No.: 6,267,346
Issued: Jul. 31, 2001
Appl. No.: 09/147,175
PCT Filed: Apr. 24, 1997
PCT No.: PCT/FR97/00740
§ 371 (c)(1),
(2), (4) Date: Feb. 25, 1999
PCT Pub. No.: WO97/40483
PCT Pub. Date: Oct. 30, 1997

(30) Foreign Application Priority Data

Apr. 25, 1996 (FR) ..... 96 05218

(51) Int. Cl.
*A47F 1/14* (2006.01)

(52) U.S. Cl. ..... 248/473; 248/316.7; 40/324

(58) Field of Classification Search ..... 248/473, 248/316.7, 316.5, 451, 453, 442, 324; 40/324
See application file for complete search history.

(56) References Cited

U.S. PATENT DOCUMENTS

| | | | | | |
|---|---|---|---|---|---|
| 327,440 | A | * | 9/1885 | Heysinger | 248/468 |
| 774,036 | A | * | 11/1904 | Burgess | 211/45 |
| 1,681,586 | A | * | 8/1928 | Kessler | 248/473 |
| 1,768,675 | A | * | 7/1930 | Egan | 248/473 |
| 2,524,647 | A | * | 10/1950 | Baldwin | 248/468 |
| 3,779,504 | A | * | 12/1973 | Schwartz et al. | 248/441.1 |
| 3,994,460 | A | * | 11/1976 | Geiger | 248/176.1 |
| 4,075,773 | A | * | 2/1978 | Daster | 40/658 |
| 4,125,243 | A | * | 11/1978 | Liptak | 248/473 |
| 4,685,647 | A | * | 8/1987 | Calhoun | 248/444.1 |
| 4,712,760 | A | * | 12/1987 | Winter | 248/451 |
| 4,882,862 | A | * | 11/1989 | Slavsky, Sr. | 40/324 |
| 5,002,249 | A | * | 3/1991 | Meyer | 248/316.7 |
| 5,533,702 | A | * | 7/1996 | Koch | 248/442.2 |
| 5,667,183 | A | * | 9/1997 | Hiromori | 248/451 |
| 5,845,889 | A | * | 12/1998 | Suzuki | 248/451 |
| 5,857,654 | A | * | 1/1999 | Berman | 248/441.1 |
| 6,059,249 | A | * | 5/2000 | Scatterday | 248/450 |

FOREIGN PATENT DOCUMENTS

| | | | | |
|---|---|---|---|---|
| FR | 906587 | * | 1/1946 | 248/473 |
| GB | 736328 | * | 9/1955 | 248/473 |
| JP | 62-23169 | | 6/1988 | |

* cited by examiner

*Primary Examiner* — Kimberly T Wood
(74) *Attorney, Agent, or Firm* — Stephen E. Feldman; Feldman Law Group, P.C.

(57) ABSTRACT

Device intended to maintain a paper sheet close to the vertical in order to facilitate the viewing thereof, characterized in that it is comprised of first holding means (1) and second holding means (2) which cooperate with the first holding means (1) so as to confer progressively to the sheet, as it is introduced between the first and the second holding means, an initial curvature which rigidifies the sheet.

12 Claims, 5 Drawing Sheets

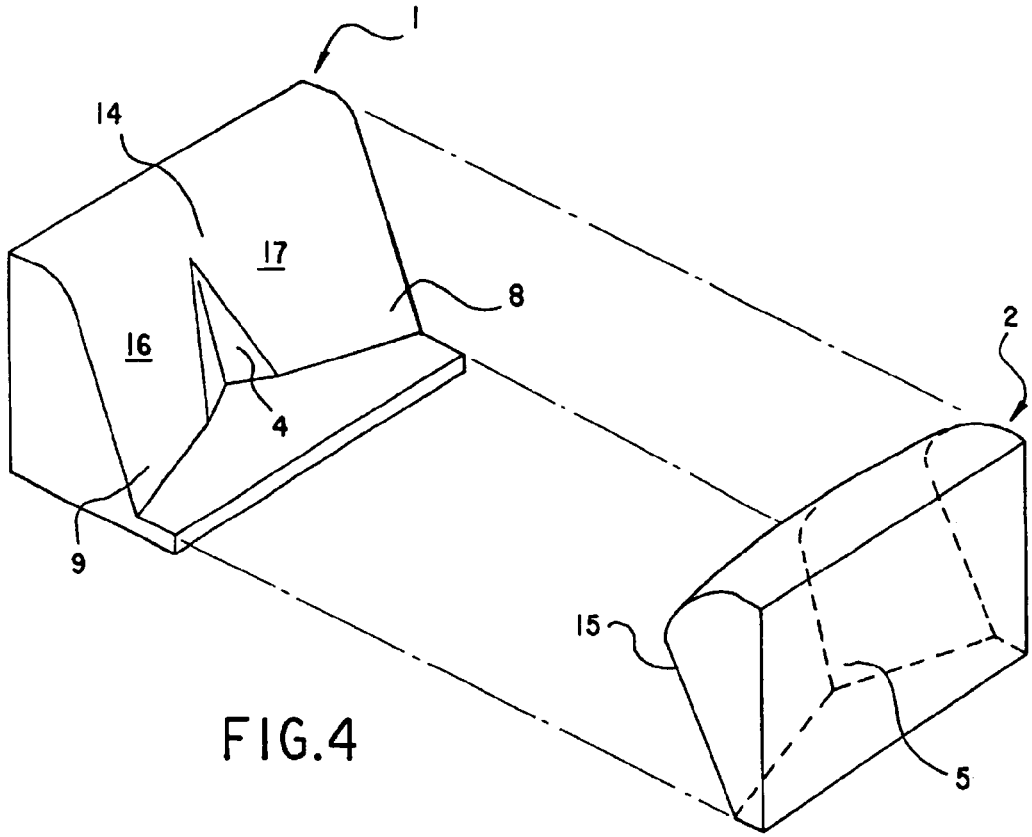
FIG.4
FIG.5
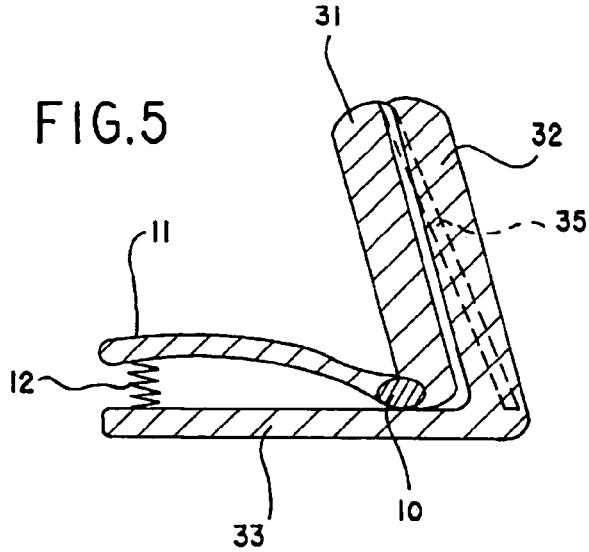

DEVICE FOR HOLDING A PAPER SHEET

Matter enclosed in heavy brackets [ ] appears in the original patent but forms no part of this reissue specification; matter printed in italics indicates the additions made by reissue.

This invention relates to a device for holding a paper sheet close to the vertical in order to facilitate the viewing thereof.

Traditionally, copyholders of different types have been used to hold document vertically.

Some of these copyholders are made of a tilted tray on which the sheet is placed and held by a gripper located on the upper section of the tray. The tray, for its own part, is held by an articulated arm, by a trestle or rests on a base. The tray-type copyholders are generally rather expensive. They are often cumbersome and fixed on the workspace (the desk) or a computer screen. Handling them can prove rather tedious.

Other copyholders are made of a gripper system clamping the document by its upper section, whereas the said document hangs freely in the air. Such copyholders must be installed at a certain height on a fixed and vertical bracket. (They are generally fixed using a double-faced adhesive or a suction cup on a wall or the upper section of a computer screen). Their use depends on the presence of a fixed bracket which, however, is very tricky to displace and reading a text becomes difficult since the mobile sheet may oscillate freely in the air.

The purpose of this invention is to remedy the shortcomings mentioned above.

More especially, the invention must suggest a solution enabling easier handling, let alone quicker handling, of the sheet to be held, during placement.

The purpose of the invention is met by a device enabling to hold a paper sheet close to the vertical in order to facilitate the viewing thereof, which comprises first holding means and second holding means which cooperate with the first holding means in order to confer to the sheet, as the former is introduced between the first and the second holding means, an initial curvature which rigidities the sheet.

The device according to the invention is intended to be placed freely on a flat surface such as a worktop or at least more or less plane a surface, such as the top of a pile of books, papers or files. In this sense, the device of the invention can be a mobile device. Moreover, this device can be a small system designed to provide, thanks to an appropriate compromise between the surface that it occupies where placed at a given location and its weight as well as the tilt of the sheet when held, stable position and holding of the sheet.

The first holding means and the second holding means are formed so that the first holding means hold the sheet by its back and can thus be considered as back holding means and such that the second holding means hold the sheet by its front and can thus be considered as front holding means.

According to some embodiments presented further, the first holding means constitute the back section of the device whereas the second holding means constitute the front section of the device.

The device of the invention is more especially designed so that the sheet to be held can be introduced between the first holding means and the second holding means without prior deformation. The sheet is therefore still plane when being fed between the first holding means and the second holding means. As a user continues to feed the sheet between the first holding means and the second holding means, the device confers, by itself, an initial vertical folding or an initial curvature since the device does not deform the sheet to the extent that a folding mark may remain after the sheet has been removed from the device. The initial curvature created towards the upper angles of the sheet, two lines of force which stretch and rigidify the said sheet mechanically and permanently, for the duration of the insertion of the sheet between the first holding means and the second holding means, allowing the said sheet to be held in a position close to the vertical in a stable manner.

The device according to the invention advantageously grips the sheet only by its lower edge and over a small height.

Although the device of the invention is mainly intended for holding one or several paper sheets, this device can also be used, without departing from the framework of this invention, for holding sheets made of any other material, such as for instance paper of different thicknesses, cardboard, synthetic material, liable to be deformed elastically for the duration of the holding process of this sheet by the device according to the invention. Moreover, the invention is not limited to the use of rectangular sheets exhibiting upper angles. But, conversely, sheets of any other shapes, for instance oval or circular, can be used.

The invention also relates to the characteristics thereunder, considered individually or according to all their technically possible combinations.

The first holding means and the second holding means define amongst themselves a space designed for accommodating the sheet, whereas the aperture of this space shrinking in the direction of insertion of the sheet.

Seen in lateral projection, the first holding means or the back section of the device and the second holding means or the front section of the device, are at their upper level distant by a space of approx. 5 to 15 mm so that the insertion of the sheet is made easier. This space shrinks towards the base of the space in order to exhibit at the base an aperture of approx. 0.2 to 3 mm. The aperture is measured, in lateral projection of the first holding means and the second holding means, as the width of the space between these means considered at the corresponding level. This shrinking can be more or less linear or, conversely, quite significant at the beginning and relatively small over the largest portion of the space.

The first means exhibit a concave surface more or less tilted backwards and provided with two bearing zones and the second means exhibit a convex surface opposite the concave surface of the first holding means and fitted with a protrusion acting on the sheet in its section arranged between both bearing zones.

The concave surface comprises a recess provided by a contraction in the material of the first holding means.

The first holding means are formed in order to exhibit mainly only bearing zones, whereas a portion of the first means located between the bearing zones is characterised at least partially by an absence of material.

This arrangement relates more particularly to two embodiments of the first holding means, i.e. a loop or a cradle on the one hand and sticks, spaced from one another, on the other.

When the right and left hand sides of the back section are materialised by plane surfaces, the said surface can form together at the base of the device an open angle whose apex is directed to the back of the device and whose value may range from 90° to 160°, the value of 140° being particularly suited.

When the bearing surfaces of the right and left hand sides of the back section are materialised by ridges, the protruding section can penetrate to such a depth that between these three points at the base of the device, an angle can be defined whose apex is represented by the protruding section and whose value may range from 90° to 160°, the value of 140° being particularly suited.

The bearing surfaces of the back section can be tilted to form an angle of 45° to 85°, the value of 65° being particularly suited so that the plan of the sheet may form with the axis of the user's eye, a right angle.

The first means and the second means or, according to a particular embodiment, the back and front sections, can be distant at the level of their upper opposite edges by a space of approx. 5 to 15 mm in order to facilitate the insertion of the sheet, whereas the value of 10 mm is particularly well suited.

When the right and left hand bearing zones of the first means or of the back section are made of plane surfaces and when the said surfaces are opposite plane surfaces constituting the second means or the front section, the distance between these sections may range from 0.2 to 3 mm, the value of 0.8 mm being particularly well suited.

The back section can be mounted on an articulation interconnected to an actuating device fitted with means to hold in position against the front section and which enable to move the back section away from the front section in order to facilitate the insertion of the sheet.

The position holding means of the back section against the front section can be a spring designed to recall automatically the back section against the front section and to bring the back section close to the front section by a gripping effect.

The device according to the invention comprises, besides the first holding means and the second holding means, at least third holding means and fourth holding means. Whereas the first and second holding means cooperate to hold a first sheet, the third and fourth holding means cooperate in order to confer to a second sheet, distant from the first one, an initial curvature which rigidifies this second sheet.

This arrangement enables to provide a device according to the invention comprising a number of holding means, whereas these means are arranged in pairs, the first and second means forming a first pair, the third and fourth means forming a second pair and so on. This arrangement enables more particularly to hold a number of sheets placed behind one another and spaced from each other. Besides this aligned disposition, it is conceivable that the pairs of holding means are arranged offset laterally or offset in decreasing height, for instance from the back to the front.

Other characteristics and advantages of the invention will be outlined by the description of a few embodiments illustrated thereunder with reference to the drawings. On these drawings:

FIG. 4 represents an exploded view of the front and back sections of the device of FIG. 1.

FIG. 5 represents a cross section of a second embodiment of the device according to the invention.

Figure 1:
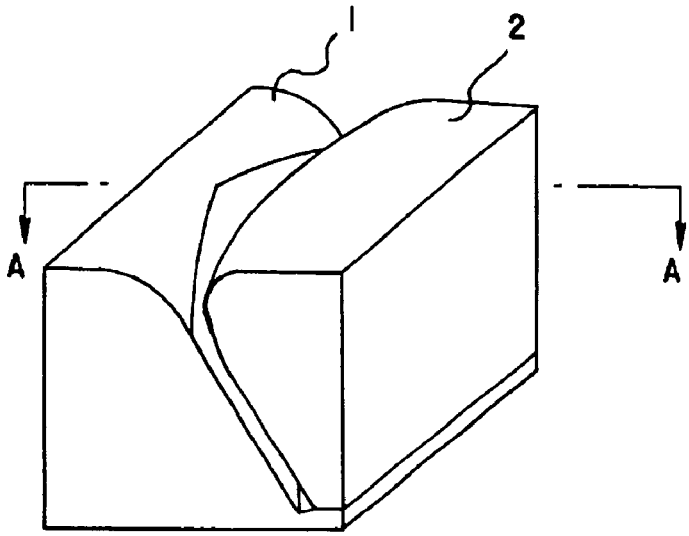
FIG. 1 represents, seen from a ¾ profile angle, a first embodiment of the device according to the invention.
Figure 2:
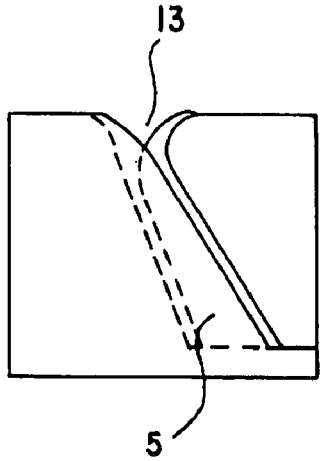
FIG. 2 represents the device of FIG. 1, seen from the left.
Figure 3:
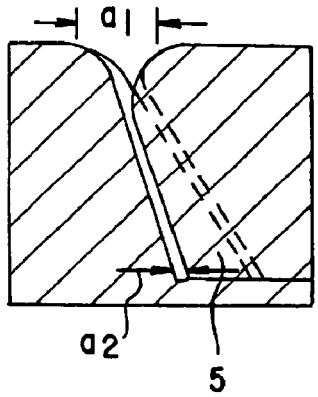
FIG. 3 represents the device of FIG. 1 as a cross section along A—A.

According to the embodiment represented on FIGS. 1 to 4, the device comprises a back section 1 and a front section 2 between which is defined a space 13 intended for accommodating a paper sheet 3 to be held. The rear section 1 is slightly tilted. Along its vertical axis of symmetry is also a recess 4 provided by a contracted zone in the material of the back section and created for accommodating a protruding element 5 in the front section 2. Two bearing zones 8, 9 can be found on either side of the recess 4. When the user inserts the sheet 3 between both sections, back 1 and front 2 sections, the protruding element 5 of the front section which pushes the sheet 3 inside the recess 4 of the back section 1 forces the said sheet to form a fold or a curvature 6, which creates lines of force 7 spreading towards the upper corners of the sheet 3. The rigidity thus obtained is sufficient to hold the sheet 3 in immobile position.

In the embodiment according to FIGS. 1 to 4, the back section 1 exhibits a concave surface 14 tilted backwards and the front section exhibits a convex surface 15. The concave surface 14 comprises the bearing zones of the right 8 and left 9 hand sides of the back section 1 made of plane surfaces 16, 17 forming among them an open angle which corresponds to the folding degree of the sheet 3, whose apex is directed towards the back of the device and whose value ranges from 90° to 160°, whereas the value of 140° is particularly well suited to cause sufficient folding 6 at the bottom of the sheet 3 whereas this folding would not prove detrimental to the user when viewing the document.

The bearing zones 8, 9 are tilted backwards so that once the sheet has been inserted in the device, it lies approximately at right angle with respect to the user's eye in order to facilitate the viewing thereof. To take into account the mean height of the user in relation to the sheet, this tilt can have a value of 45° to 85°, whereas an angle of 65° is generally well suited.

The device of the invention such as represented on FIGS. 1 to 4 is composed of two separate sections 1 and 2 making up respectively the first and the second holding means of the device. The section 2 is fixed, for instance glued, on the section 1.

However, it is also conceivable that, as a variation, the device is single-block if made of a massive material or it can be formed, at least, of a shell open downwards and delineating the same space 13 as the device according to FIGS. 1 to 4. In the latter case, the inside of the shell can be filled, at least partially, with a heavy material, possibly a granular material, such as metallic small shot, and enclosed by a plate.

The back section 1 and the front section 2 define between them a space 13 intended for accommodating the sheet 3 whose aperture a is much wider at the upper level of the device than at the base of the space 13. The space 13 whose aperture a1, measured at the upper level of the device corresponds to a value ranging from 5 mm to 15 mm, shrinks towards the bottom of the space, so that the space, seen along a cross section A—A from the front to the back of the device, exhibits the shape of a funnel enabling easy insertion of the sheet in the device. The surfaces 14 and 15 guide the sheet easily towards the bottom of the device where the recessed 4 and protruding 5 zones can be found.

On either side of the recess 4, the front 2 and back 1 sections exhibit opposite plane surfaces, separate at the base of the space 13 by a distance a2 which may range from 0.2 mm to 3 mm, whereas the value of 0.8 mm is sufficient for easy insertion of one to five sheets of ordinary paper (80 g) whereby the folding conferred to the sheet is not marked permanently, even when the protruding section 5 is materialised by a ridge.

In the embodiment according to FIG. 5, the back section is composed of a plate 31 and the front section of a plate 32 interconnected to a base plate 33. The front section 32 and the back section 31 correspond as regards to their shape and function, respectively to the front and back sections according to FIGS. 1–4. The back section 31 has a recess 4 into which a protruding element 35 of the front section is to be accommodated. The plate 31 is articulated on an axis 10 situated at the base of the back section, parallel to the lower plane of the device and perpendicular to the bisectrix of the angle defined by the sides 8 and 9. The plate 31 is interconnected to a lever 11 which enables it to toggle away from the front section 32 when the user depresses the lever 11 in order to facilitate the insertion of the sheet 3. While the user depresses the lever 11, the plate 31 and the front section 32 form, temporarily, a space corresponding to the space 13 of the device according to FIGS. 1 to 4. A spring 12 tends to push the back section 1 against the front section 32 with sufficient pressure to force the sheet 3 to hug the shapes of the front and back sections.

In case when the device is made of a light material (plastic material), it is provided with removable attachment or counterweight means, such as a double-faced adhesive, under its base.

Figure 6:
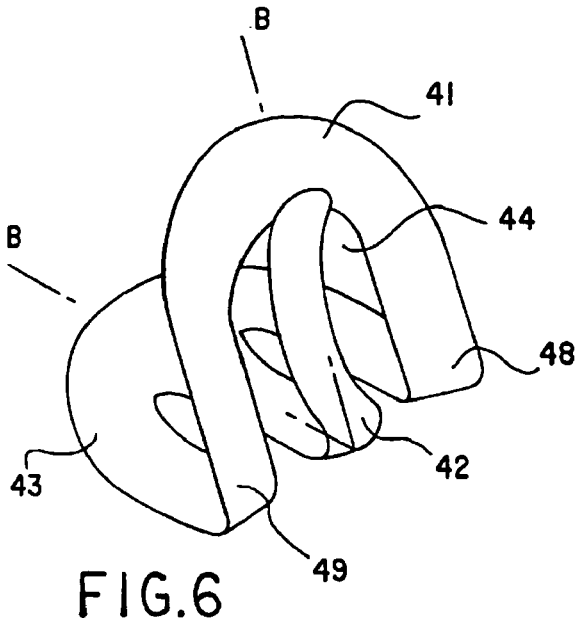
FIG. 6 represents, seen from a ¾ profile angle, a third embodiment of the device according to the invention.
Figure 7:
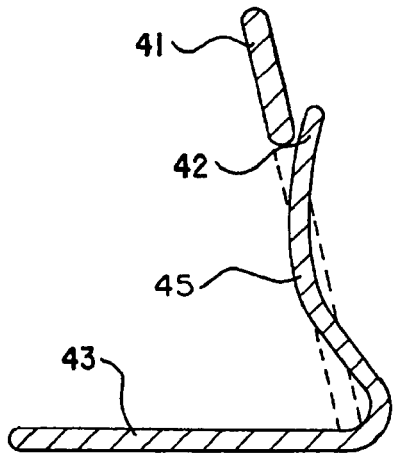
FIG. 7 represents the device of FIG. 6 as a cross section along B—B.
Figure 8:
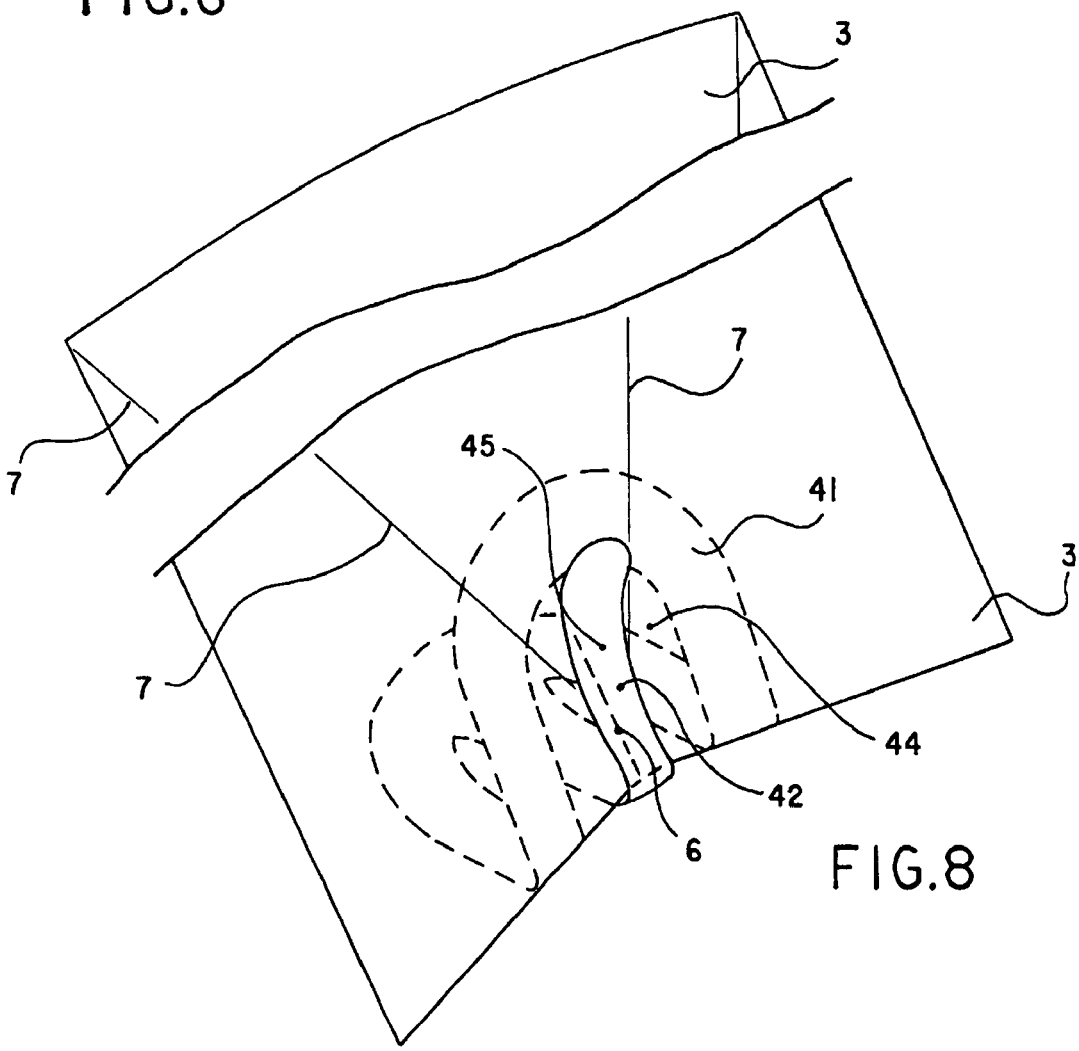
FIG. 8 represents, seen from a ¾ profile angle, the device of FIG. 6 with a paper sheet.

In the embodiment represented on FIGS. 6 to 8, the first holding means are constituted by an element 41, an arc of a circle or an oval arc, whose extremities are interconnected to a base plate 43. The extremities of the element 41 constitute bearing zones 48 and 40 whose function corresponds to the bearing zones 8 and 9 of the embodiment according to FIG. 1. The second holding means are made of a tongue 42 shaped in order to exhibit a protruding section 45 performing the same function as the protrusion 5 of the embodiment according to FIG. 1. The tongue 42 is linked by its lower end to the base plate 43.

Whereas each of the bearing zones 48 and 49 of the element 41 extends mainly in a given plane, the tongue 42 shows a curvature to obtain the protruding section 45. The inside of the element 41 encloses a zone 44 provided by the absence of material and fulfilling the same function as the recess 4 of the embodiment according to FIG. 1. The element 41 thus formed and the tongue 42 thus formed constitute the funnel for the insertion of the sheet to be held as well as the bearing and protruding zones necessary for stable holding of the sheet 3. FIG. 7 shows just this in a cross section along the B—B line specified in FIG. 6. FIG. 8 represents this layout with a sheet 3 inserted in the device according to the invention.

Figure 15:
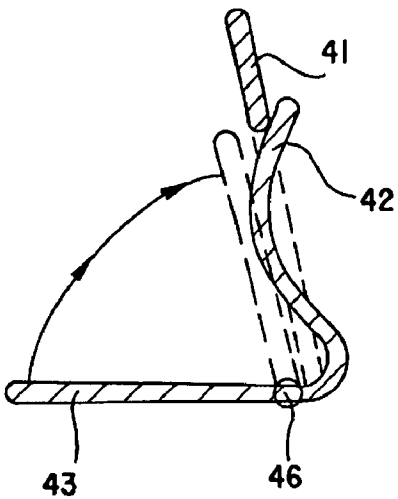
FIG. 15 represents a variation of the device of FIG. 6.

According to a variation represented on FIG. 15, the element 41 and the tongue 42 can be linked to the base plate 43 by an articulation 46.

Figure 9:
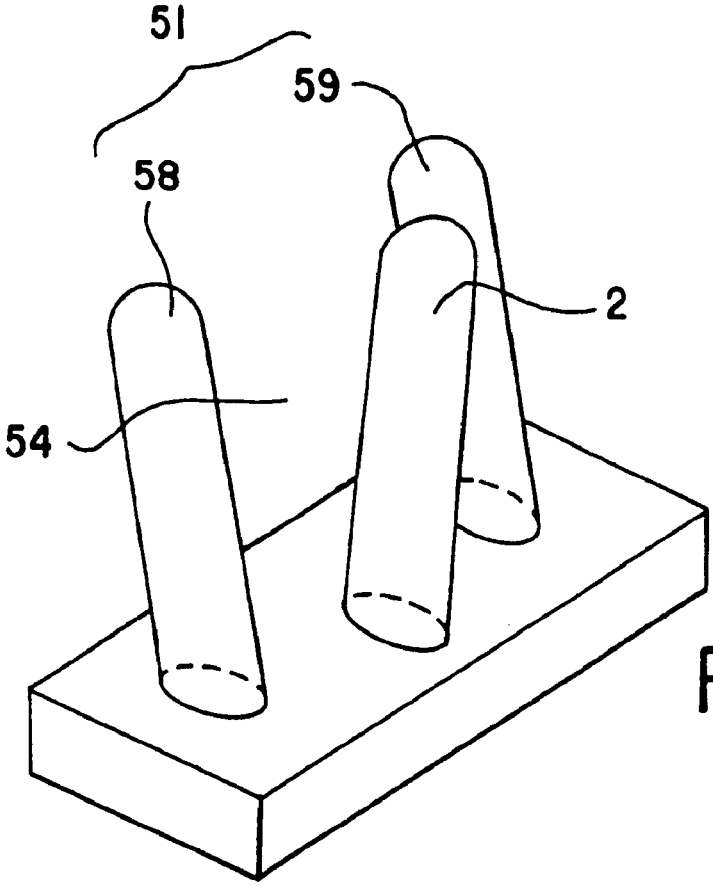
FIG. 9 represents, seen from a ¾ profile angle, a fourth embodiment of the device according to the invention.
Figure 10:
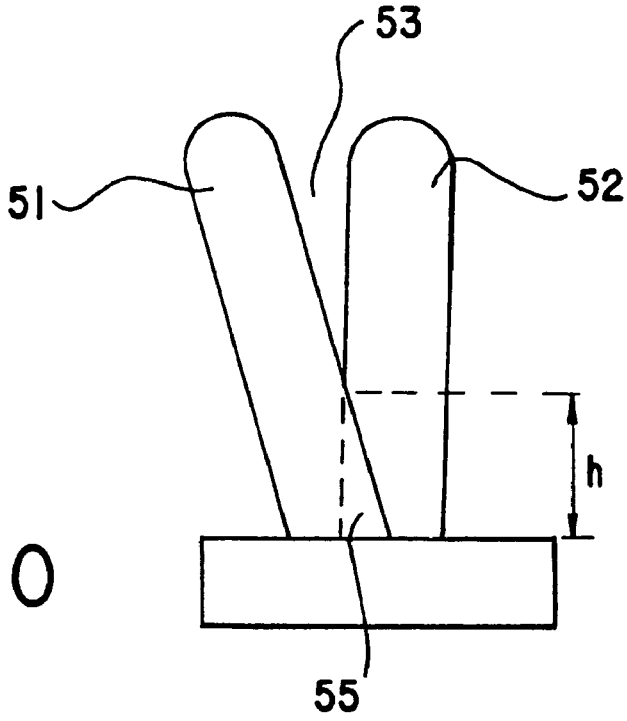
FIG. 10 represents the device of FIG. 9 seen as a lateral projection.

In the embodiment represented on FIGS. 9 and 10, the bearing surfaces of the back section are provided by ridges 51 and the protruding section, made of a ridge 52, penetrates between them at the level of the base of a recess 54 to such a depth that between these three element, an open angle is delineated, whose apex is represented on the base of the protruding section 5 and whose value ranges from 90° to 160°, whereas the value of 140° is particularly well suited.

The ridges 51 and 52 are arranged and tilted in order to fulfil the functions the bearing surfaces 58, 59 corresponding to the bearing surfaces 8 and 9 of the embodiment according to FIG. 1, as well as the functions of the protruding section 55 corresponding to the protrusion 5 of the said embodiment, while providing a space 53 in the shape of a funnel in order to facilitate the insertion and the placement of the sheet to be held.

Besides the arrangement of the ridges 51 and 52, FIG. 10 shows more particularly an advantage of the device according to the invention, common to all the embodiments. It relates to the small height h on which the means representing the bearing zones of the first holding means and the protrusion of the second holding means overlap each other partially, seen as a lateral projection. The height h of this interaction zone is approx. 2 cm and is sufficient to confer, to the sheet to be held, sufficient curvature to ensure the requested rigidity of the sheet to be held.

Figure 12:
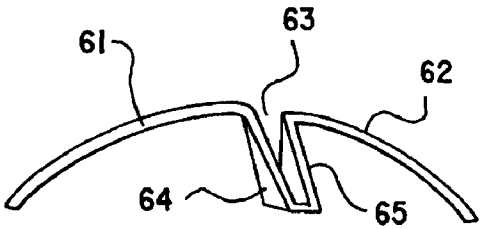
FIG. 12 represents the device of FIG. 11 seen as a lateral projection.
Figure 11:
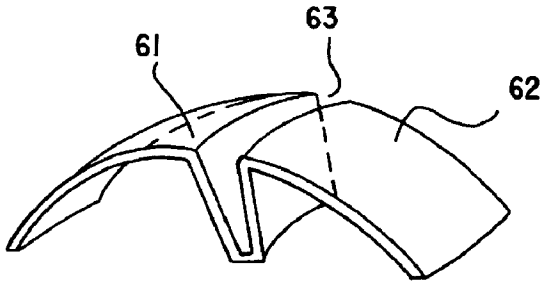
FIG. 11 represents, seen from a ¾ profile angle, an embodiment of a light device according to the invention.

The embodiment of the device according to the invention, such as represented on FIGS. 11 and 12 differs from the other embodiments described so far since it reminds of the shape of a sheet. This sheet, which is more or less rectangular, is curved, as seen as a lateral projection, and composed of a first section 61 and a second section 62, separate by a space 63. The space 63 is delineated by an element 64 interconnected to the first section 61 and an element 65 interconnected to the second section 62, whereas the elements 64 and 65 are linked together at the base of the space 63. The elements 64 and 65 are folded or curved in order to constitute respectively bearing zones, a protrusion and a space intended for accommodating the sheet to be held, whereas the space has the shape of a funnel shrinking downwards. The device in general and the elements 64, 65 in particular, thus reproduce the essential sections and functions of the embodiment according to FIG. 1.

The device of the invention according to the embodiment represented on FIGS. 11 and 12 can be made of synthetic material, such as for instance an ABS (acrylnitrile-butadiene-styrene) resin. The device of the invention is therefore easy to produce, for instance by injection. In order to obtain a stability comparable to that of a device manufactured according to the embodiment of FIG. 1, the area of the support on which the device will rest, must be wide enough to guarantee that the centre of gravity of a sheet to be held for a range of selected sizes and weights, does not come out of the surface covered by the device.

Whereas the sizes of the device according to FIG. 1 are approx. 4 cm in height, 6 cm in depth and 5 cm in width, with a weight of 110 to 120 g when it is filled with small shot, the sizes of the device according to FIG. 11 become 5 cm in height and width, 12 cm in length. Its weight is approx. 25 g.

Figure 14:
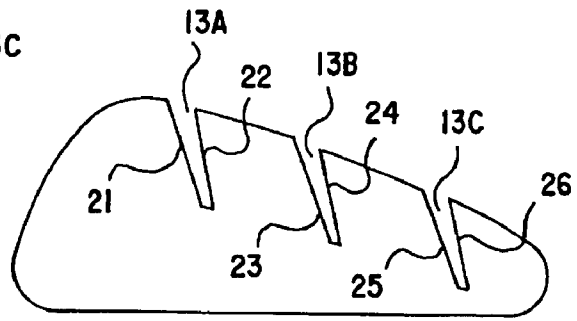
FIG. 14 represents the device of FIG. 13 seen as a lateral projection.
Figure 13:
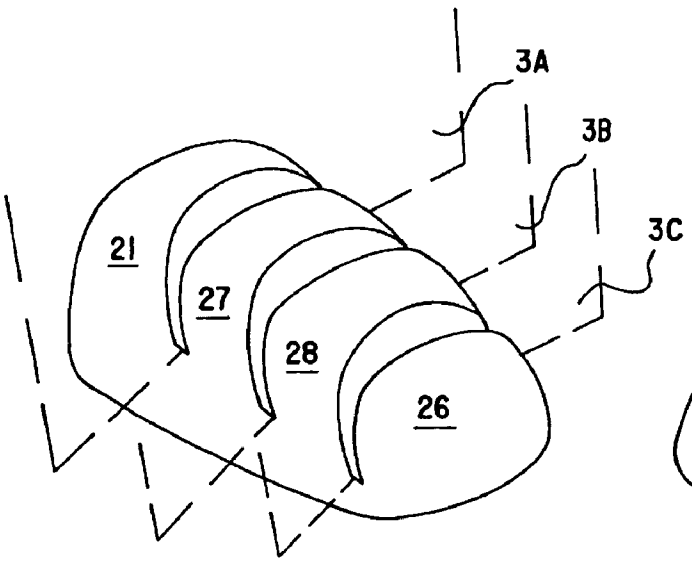
FIG. 13 represents, seen from a ¾ profile angle, an embodiment of the device according to the invention for several spaced sheets.

According to the embodiment represented on FIGS. 13 and 14, the device of the invention is formed by an oblong body comprising, in this order, a rear section 21, two intermediate sections 27, 28 and a front section 26, each of these sections being separate from the adjacent section by a space 13A, 13B or 13C intended for holding a sheet 3A, 3B or 3C. The spaces 13A, 13B and 13C are arranged at three different levels in order to place the sheets on staggered heights, which enables to receive them simultaneously.

Whereas the back section 21 and the front section 26 correspond, as regards their shapes and functions, respectively to the back section 1 and the front section 2 of the device according to FIG. 1, the intermediate sections 27 and 28 are formed in order to fulfil the function of the front section as well as the function of the back section.

To this end, the intermediate section 27 is formed on the side 22 opposite the back section 21, as a front section and on the side 23 opposite the intermediate section 28, as a back section. In the same way, the intermediate section 28 comprises a side 24 arranged opposite the intermediate section 27 and shaped as a front section and a side 25 arranged opposite the front section and formed as a back section. Thus, the device comprises three pairs of holding means referred to respectively as 21/22, 23/24 and 25/26. The shapes and the functions of these means correspond essentially to those of the first and second holding means 1 and 2, their detailed description is omitted to avoid repetitions.

The holding device represented on FIGS. 13 and 14 is a single block, approx. 10 cm in length, 6 cm in width at the back and 5 cm at the front of the device, 6 cm at the back and 4 cm at the front of the device.

The device according to the invention is particularly intended for users who, within the framework of their activities, studies or leisure time, need to view easily a document on paper (text, drawing, picture, photo). It can be made of different materials such as for instance crystal, cast aluminium, bronze, stainless steel, sanded paper pulp, possibly coloured, and wood. In the light version, the device can be made of, besides ABS resins, any other plastic material, and particularly advantageously, polypropylene.

The space between the first and the second holding means can be obtained, notably for devices made of a non-cast massive material, by spark machining or any other appropriate abrasive process.

The reference signs inserted after the technical characteristics mentioned in the claims solely aim at facilitating the understanding of the latter and do not limit their extent in any way.

What is claimed is:

1. A device for holding a paper sheet in order to facilitate the viewing thereof, wherein the device comprises a first holding element having two bearing zones, and a second holding element having a protruding section, the first and second holding elements defining between them a space having a top and a base, said space opening upwards for accommodating the paper sheet to be inserted between the first and second holding elements, with the top of said space wider than the base of said space, wherein said space progressively narrows, from the top to the base, with a greater gradient near the top relative to near the base of said space, wherein the first and second holding elements are *generally resistant to permanent deformation when the paper sheet is removed from the device and* arranged such that (a), the protruding section and the bearing zones overlap each other partially to enable a curvature to be conferred gradually upon the paper sheet to be inserted, wherein the protruding section and the bearing zones are tilted backwards with the protruding section tilted less than the bearing zones, (b) two lines of force are allowed to be created, on the paper sheet to be inserted, towards the upper angles of the paper sheet in order to rigidify the paper sheet, and (c) the device allows the paper sheet to be inserted to obtain a backward tilt ranging from 45° to 85°, and the first holding element comprises a recess between the bearing zones.

2. A device according to claim 1, wherein each of the bearing zones of the first holding element independently comprises a plane surface delineating between them, at the base of the space, an obtuse angle whose apex is directed towards the back of the device and wherein said obtuse angle is of 90° to 160°.

3. A device according to claim 1, wherein the device further comprises a base, wherein the bearing zones are connected near a top part of the device and separated by a gap near the base of the device.

4. A device for holding a paper sheet in order to facilitate the viewing thereof, wherein the device comprises a first holding element having two bearing zones, and a second holding element having a protruding section, the first and second holding elements defining between them a space having a top and a base, said space opening upwards for accommodating the paper sheet to be inserted between the first and second holding elements, with the top of said space wider than the base of said space, wherein said space progressively narrows, from the top to the base, with a greater gradient near the top relative to near the base of said space, wherein the first and second holding elements are arranged such that (a), the protruding section and the bearing zones overlap each other partially to enable a curvature to be conferred gradually upon the paper sheet to be inserted, wherein the protruding section and the bearing zones are tilted backwards with the protruding section tilted less than the bearing zones, (b) two lines of force are allowed to be created, on the paper sheet to be inserted, towards the upper angles of the paper sheet in order to rigidify the paper sheet, and (c) the device allows the paper sheet to be inserted to obtain a backward tilt ranging from 45° to 85°; and the first holding element is mounted on an articulation interconnected to an actuating body fitted with a compressible element in position against the second holding element, wherein actuation of the actuating body enables the first holding element to be spread apart from the second holding element in order to facilitate placement of the paper sheet to be inserted.

5. A device for holding a paper sheet in order to facilitate the viewing thereof, wherein the device comprises a first holding element having two bearing zones, and a second holding element having a protruding section, the first and second holding elements defining between them a space having a top and a base, said space opening upwards for accommodating the paper sheet to be inserted between the first and second holding elements, with the top of said space wider than the base of said space, wherein said space progressively narrows, from the top the base, with a greater gradient near the top relative to near the base of said space, wherein the first and second holding elements are arranged such that (a), the protruding section and the bearing zones overlap each other partially to enable a curvature to be conferred gradually upon the paper sheet to be inserted, wherein the protruding section and the bearing zones are tilted backwards with the protruding section tilted less than the bearing zones, (b) two lines of force are allowed to be created, on the paper sheet to be inserted, towards the upper angles of the paper sheet in order to rigidify the paper sheet, and (c) the device allows the paper sheet to be inserted to obtain a backward tilt ranging from 45° to 85°; and each of the bearing zones of the first holding element independently comprises a plane surface, an obtuse angle being defined between said plane surfaces at the base of the space having an apex directed towards the back of the device, said obtuse angle being from 90° to 160°.

6. A device according to claim 5, wherein the device allows the paper sheet to be inserted into said space to obtain a backward tilt of 65°.

7. A device according to claim 5, wherein the device further comprises a base, wherein the bearing zones are connected near a top part of the device and separated by a gap near the base of the device.

8. The device for holding a paper sheet in order to facilitate the viewing thereof, wherein the device comprises:

a first holding element having two bearing zones, a second holding element having a protruding section on one surface and two bearing zones on an opposite surface, a third holding element having a protruding section on one surface and two bearing zones on an opposite surface, a fourth holding element having a protruding zone, wherein the protruding section of the second holding element is disposed toward the bearing zones of the first holding element and the bearing zones of the second holding element is disposed toward the protruding section of the third holding element, and the bearing zones of the third holding element is disposed toward the protruding section of the fourth holding element, wherein the first and second holding elements defining between them a space having a top and a base, the space open upwards for accommodating at least a first paper sheet to be inserted between the first and second holding elements, with a top of said space wider than the base of said space, wherein said space progressively narrows, from the top to the base, with a greater gradient near the top relative to near the base of said space, wherein the second and third holding elements defining between them a space having a top and a base, the space open upwards for accommodating at least a second paper sheet to be inserted between the Second and third holding elements, with a top of said space wider than the base of said space, wherein said space progressively narrows, from the top to the base, with a greater gradient near the top relative to near the base of said space, wherein the third and fourth holding elements defining between them a space having a top and a base, the space open upwards for accommodating a third paper sheet to be inserted between the third and fourth holding elements, with a top of said space wider than the base of said space, wherein said space progressively narrows, from the top to the base, with a greater gradient near the top relative to near the base of said space, and wherein the first, second, third and fourth holding elements are arranged such that (a) the protruding sections of the second, third and fourth holding elements overlap partially the bearing zones of the first, second and third holding elements respectively to enable a curvature to be conferred gradually upon the paper sheets to be inserted, wherein the protruding sections and the bearing zones are tilted backward with the protruding sections tilted less than the bearing zones, (b) two lines of force are allowed to be created on the paper sheets to be inserted, toward the upper angles of the paper sheet in order to rigidify the paper sheets, and (c) the device allows the paper sheets to be inserted to obtain a backward tilt ranging from 45° to 85°; and each of the bearing zones of the first, second and third holding elements independently comprises a plane surface, and obtuse angle being defined between said plane surfaces at the base of the space having an apex directed towards the back of the device, said obtuse angle being from 90° to 160°.

*9. A device according to claim 1 wherein said first holding element is a concave surface, said concave surface having a right side and a left side.*

*10. A device according to claim 9 wherein one of the two bearing zones is defined by the right side of the concave surface and the other bearing zone is defined by the left side of the concave surface.*

*11. A device according to claim 10 wherein the recess is defined by an area between the right side of the concave surface and the left side of the concave surface.*

*12. A device according to claim 8 wherein the bearing zones of said first holding element, said second holding element and said third holding element are concave surfaces, said concave surfaces having a right side and a left side.*

* * * * *